Nov. 5, 1974 D. D. STREETER, JR., ET AL 3,846,216
REINFORCEMENT MAT FOR TIRE
Filed Sept. 21, 1972  2 Sheets-Sheet 1

Nov. 5, 1974  D. D. STREETER, JR., ET AL  3,846,216

REINFORCEMENT MAT FOR TIRE

Filed Sept. 21, 1972  2 Sheets-Sheet 2

United States Patent Office 3,846,216
Patented Nov. 5, 1974

3,846,216
REINFORCEMENT MAT FOR TIRE
Daniel D. Streeter, Jr., 4201 51st Ave. NE.,
Seattle, Wash. 98105
Original application Oct. 20, 1970, Ser. No. 82,423, now Patent No. 3,712,361. Divided and this application Sept. 21, 1972, Ser. No. 291,054
Int. Cl. B32b 7/04, 5/12
U.S. Cl. 161—49                    14 Claims

ABSTRACT OF THE DISCLOSURE

A tire construction comprising an inner reinforcement mat having a plurality of tethered but free sliding fiber layers, each fiber layer comprising at least two sets of tethered but free sliding parallel fibers with one set being disposed angularly with respect to the other. The two sets are tethered by connections connected at a plurality of points of intersection and define a mean angular disposition for the layer. Each successive layer of fibers is disposed angularly with respect to the adjacent layer with each layer being tethered by attachments attached to adjacent layers at a plurality of points spaced from the fiber sets connected points whereby when the reinforcement mat is repeatedly compressed stretched or flexed or stressed by external forces on the tire, the fibers of each layer will reversibly tend to mesh and unmesh with fibers of adjacent layers.

---

This is a division of application Ser. No. 82,423, filed Oct. 20, 1970, now U.S. 3,712,361.

This invention relates to a novel tire construction which is adaptable for pneumatic tires, radial ply tires, aircraft low profile tires, solid core tires and all tires made of natural or synthetic elastomeric stock.

Prior to the present invention, designers have sought to design tires which will withstand the various stresses tires are subjected to in normal wear, which will insure the proper amount of cushioning to the supported vehicle and which will wear extremely well.

The main approach to provide tires meeting these requiremnts has been to construct the inner tire of bonded fiber layers. Many innovations have taken place within this general approach.

Some tires have been constructed with bias cord structures therein. These tires consist usually of a carcass layer, breaker layer and head portion wherein the carcass layer consists of piled layers of parallel rubber coated cords extending from the head to head of the tire and two or more of these parallel carcass layers are so combined that each cord intersects with each other to resist various stresses caused on the carcass by the air pressure created, as in the case of running, by the external forces.

Also, beaker layers have been inserted between the tread rubber and the carcass portion with a breadth extending from shoulder to shoulder of a tire and serve to concentrate the effect of the external forces on the carcass layers and also reinforcing the carcass layer.

The use of one or more varrier plies of small cords between the inner ply of large cords and the air-retaining liner has been proposed. The theory being that this prevents the underlap cords or the cords nearest the liner from projecting into and thus thinning down this liner.

The use of lubricants, such as zinc stearate, to facilitate independent movement of adjacent tire components during the forming process of the tire has been suggested. The use of the lubricant, however, was limited to the forming process, permanent bonding of layers preventing any further independent movement.

The use of "differential angle" construction in tires has also been proposed in which a wide sheet of fabric is laid on a tire building drum in a radial direction, at 90° angles to a plane perpendicular to the axis of the drum, and then turned up at an angle at substantially less than 90°, in the 70° to 80° range.

In this regard, tire construction employing plies with mutually different extensibility characteristics have been used. I.e., the cords of one ply are symmetrically disposed with respect to the cords of the other ply, the plane of symmetry being the midcircumferential plane of the tire perpendicular to the rotational axis thereof.

All of the prior art discussed and that not discussed generate excessive heat during the cyclic flexing or stretching because the fibers are neither lubricated nor free to slide over one another. I.e., the fiber layers are completely bonded to one another. Thus, since the optimal design configuration of all pneumatic tires of the prior art is implicitly that with the thinnest wall, attention is generally focused on the danger of blowouts. On the other hand, solid core tires are generally unattractive because of their poor cushioning to the supported vehicle.

The present invention overcomes these disadvantages because the fibers are uniquely tailored into a multilayered mat that is capable of large dimensional changes, cyclically, with minimal heat of friction due to shear between fibers, regardless of the thickness of the mat. This is done by insuring that adjacent fibers are always almost parallel, are intermittently joined, and are sufficiently free and lubricated to permit easy rolling or sliding laterally over each other to an extent limited by the spacing of the interfiber junctions. The ends of each fiber are usually attached to themselves or to a rigid part of the carcass such as the beads, or wheel rim in the case of the solid wheel. As the thickness of the mat is traversed, the mean fiber direction changes smoothly by small increments in one direction. Thus, when the tire is deformed, adjacent fiber layers can merge, two layers becoming as one layer of increased surface area. Each fiber carries only an axial load and normal loads on its sides. Shear loads are transmitted essentially as increments of tension at the fiber junctions. Because the stresses in tires are multidirectional, this invention optimally allows for the probable distribution of stress directions and magnitudes, the fiber directions being tailored to the stress directions.

These and other advantages of the present invention will be apparent during the following discussion with reference to the accompanying drawings wherein.

Figure 1:
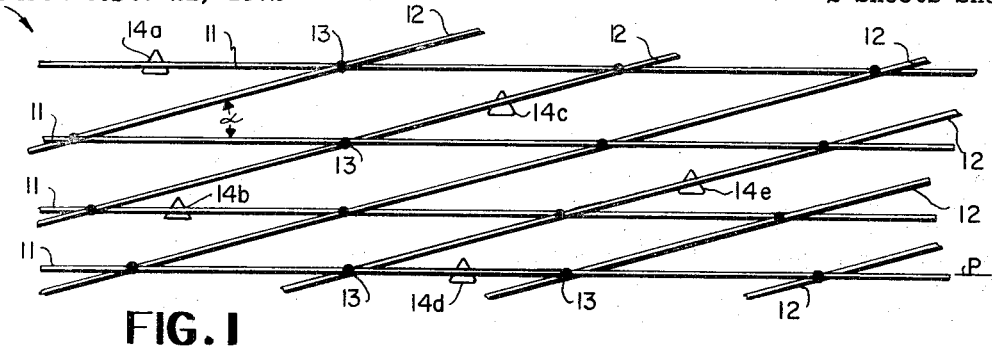
FIG. 1 is a plan view of a fiber layer showing the points on connection with the fiber laver of FIG. 2.

Referring now to FIG. 1, there is shown a layer 1 of fibers, some being essentially horizontally oriented in a parallel manner such as fibers 11 and other fibers 12 being parallel oriented at an angle α to fibers 11. The two sets of fibers 11 and 12 are connected to each other at node points 13 in any suitable manner. Since the sets of fibers are connected to each other preferably at every intersection of a fiber 11 and a fiber 12, and possibly at points inbetween if angle α is very small (not illustrated), only a few node points are shown designated as 13 but it is understood that generally the fibers are connected to each other at every intersection.

Also shown are a second series of node points 14 at which layer 1 is connected to adjacent layer 2. For convenience, five node points 14 are shown; 14a, 14b, 14c, 14d and 14e. It is understood that there may be any number of these adjacent layer node points for a given area between layers, i.e., the density of connection points between fiber layers may vary.

Figure 2:
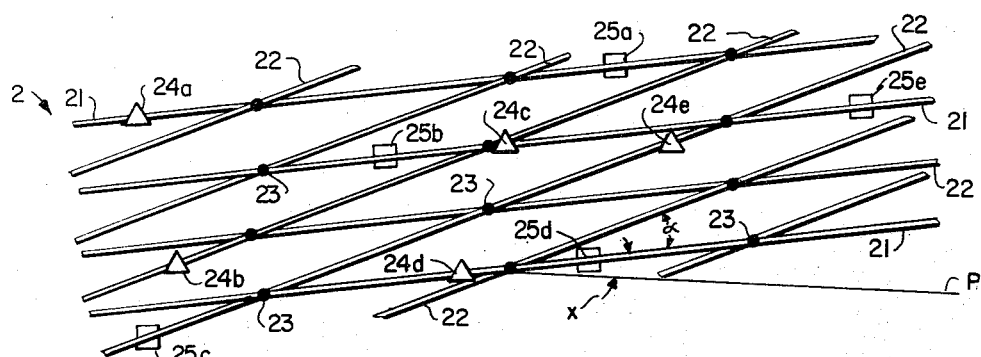
FIG. 2 is the fiber layer adjacent to the layer of FIG. 1 showing the offset fiber orientation and the connection points with the layers of FIGS. 1 and 3.

As shown in FIG. 2, a fiber layer 2 is arranged so as to have one set of parallel fibers 21 and a second set of parallel fibers 22, the second set's orientation being offset from fibers 21 by angle α. Further, the fibers 21 are offset from the direction of fibers 11 in layer 1 by an amount indicated by angle X in FIG. 2. Fibers 22 are offset from the direction of fibers 12 in layer 1 by the same angle X. This offsetting of layers is shown in the figures with reference to a direction P which, for the sake of convenience, is the direction of fibers 11 in FIG. 1.

Shown in FIG. 2 are intra layer node points 23, at which the fibers 21 and 22 are connected in any suitable fashion. Since there is a connection preferably at every intersection of a fiber 21 with a fiber 22, and possibly at points inbetween if angle α is very small (not illustrated), only a few intersections are noted by the numeral 23 but it is understood that the two sets of fibers in FIG. 2 are generally connected at every intersecting point.

A first series of inter layer node points 24 are also shown in FIG. 2. These are shown as points 24a, 24b, 24c, 24d and 24e. These points match points 14a, 14b, 14c, 14d and 14e, respectively, in FIG. 1 and are where layers 1 and 2 are connected together. It should be noted at this time that the inter layer node points do not correspond with intra layer node points of either FIG. 1 or FIG. 2. This manner of attaching the offset layers affords a great resiliency to the construction.

Again, while five intra layer node points for connection with layer 1 are shown in FIG. 2, it is understood that any number may be employed depending on the characteristics desired for the particular construction.

Also shown in FIG. 2 are a second series of inter layer connection node points 25. There are five shown; 25a, 25b, 25c, 25d and 25e. These points are for connecting layer 2 to layer 3 and are shown as squares.

Figure 3:
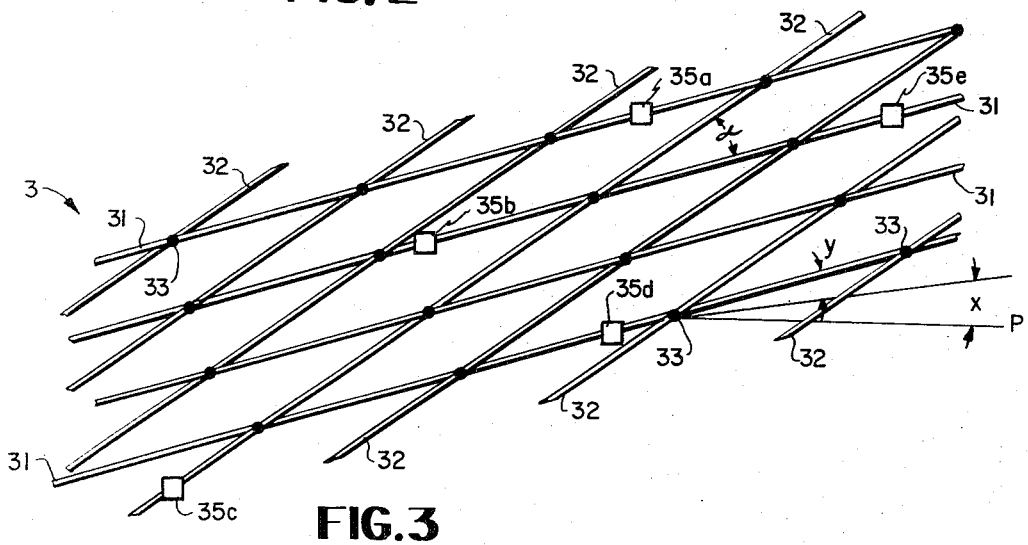
FIG. 3 is the next fiber layer showing the fiber orientation and the connection points with the layer of FIG. 2.

FIG. 3 shows fiber layer 3 which is adjacent layer 2 on the side of layer 2 opposite from layer 1. It consists of a set of parallel fibers 31 and a set of intersecting parallel fibers 32. As is shown in FIG. 3, fibers 32 are offset from fibers 31 by an amount indicated by angle α. This is the same amount that fibers 12 are offset from fibers 11 and that fibers 22 are offset from fibers 21.

Fibers 31 are offset from the direction of fibers 21 by an amount indicated by angle Y and the fibers 32 are offset from fibers 22 by the same amount. Since fibers 21 are offset from the direction P of fibers 11 by the angle X it follows that fibers 31 are offset from direction P by the angle $(X+Y)$. Since fibers 32 are at angle α to fibers 31, fibers 32 are offset from direction P by angle $(X+Y+\alpha)$.

In the preferred form of this invention, each succeeding layer is offset from the adjacent layers by the same amount so that in layers 1, 2, and 3, angle $X=$angle $Y$. To determine then the orientation of any given layer, one choses a reference direction P, then determines the amount X that each layer's fiber orientation is offset from the adjacent one and finally determines the intra layer angle α for offset between sets of fibers within any given layer. The angles α and X are constant for all layers in the preferred form of this invention but may be varied individually from layer to layer.

However, assuming X and α as constant the orientation of the first set of fibers in any given layer is $nX$, the $n$ being the number of the layer assuming the reference layer as $n=0$. The orientation of the second set of fibers in that layer would be $nX+\alpha$ with reference to direction P.

Referring back to FIG. 3, there is shown intra layer connection node points 33, only a few being designated for the sake of illustration. Also shown are inter layer connection node points 35a, 35b, 35c, 35d and 35e which connect with points 25a, 25b, 25c, 25d and 25e, respectively in layer 2 as shown in FIG. 2.

While only three fiber layers have been shown it is understood that any number of fiber layers may be employed to form a mat or reinforcing construction.

Figure 4:
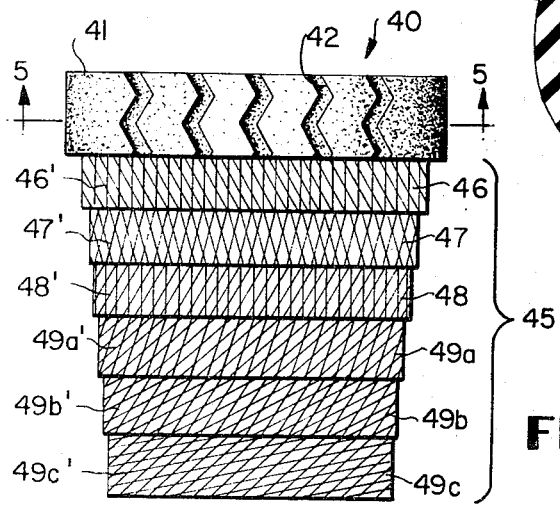
FIG. 4 is a cut-away view of a tire employing the several fiber layers showing the relationship between fiber orientation in each layer.

Referring now to FIG. 4, there is shown a cut away plan view of a tire tread, showing the ply construction resulting from using layers of fiber as depicted in FIGS. 1–3. Generally, a casing is designated as 40 with tread portion 41 and indentations 42. A reinforcement is designated generally as 45 and consists of layers of offset sets of fibers 46, 47, 48, 49a, 49b, and 49c. As shown in FIG. 4, the fibers 46', which are approximately vertical in layer 46, are offset on each successive layer such as shown at 47', 48', 49a', 49b', and 49c'. The amount of offset is constant angle X. I.e., the amount of fiber offset of fiber 49a' is 3X as compared with fiber 46'.

Figure 5:
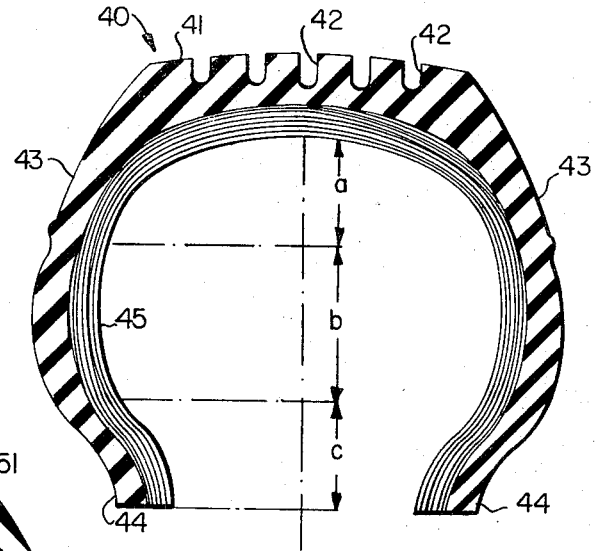
FIG. 5 is a cross-sectional view taken along line 5—5 of FIG. 4.

FIG. 5 shows a cross-sectional view of the tire shown in FIG. 4. The tire casing 40 includes a tread 41 having indentations 42 therein, sidewalls 43, and a heading 44. The tire is made of natural or synthetic elastomeric stock having a modulus of elasticity of conventional values. In the tire casing 40 shown, the distances a, b and c, as shown in FIG. 4, are the portions of the tire which provide, respectively, the radial flexibility, the longitudinal rigidity and the lateral rigidity. Of course, these distances can vary depending on the particular casing and lining construction.

The casing reinforcement mat, constructed in accordance with the principles of this invention, is shown as 45.

Figure 6:
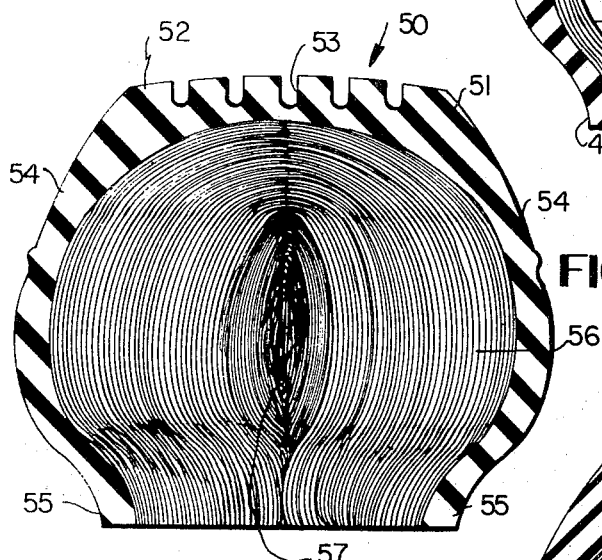
FIG. 6 is a cross-sectional view similar to FIG. 5 but showing a solid tire construction employing a core consisting of a plurality of fiber layers.

FIG. 6 shows a cross-sectional configuration of a tire 50 having a tire casing 51 with a tread portion 52 with tread grooves 53, sidewalls 54 and heading portions 55. A central core section 56 is composed of a plurality of fiber layers which converge on point 57.

Figure 7:
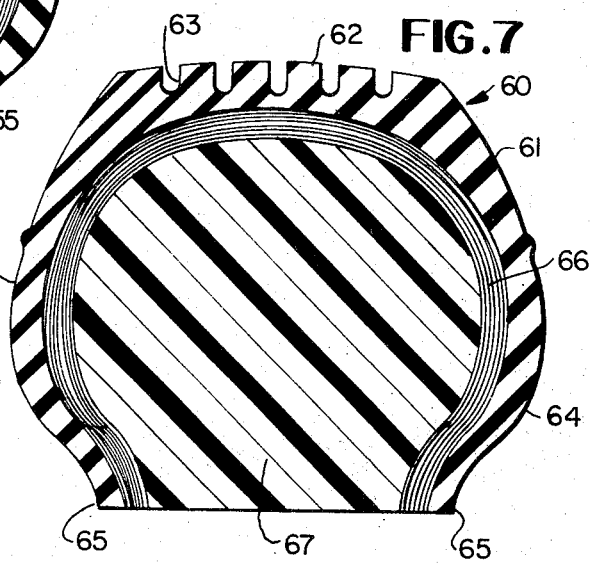
FIG. 7 is a cross-sectional view similar to FIG. 6 showing a core construction consisting of a number of fiber layers and a solid resilient member.

FIG. 7 shows a cross section of another embodiment of a tire 60 employing the layered fiber construction of this invention. It consists of a tire 60 having a casing 61 with a tread section 62, sidewalls 64 and heading sections 65. Grooves 63 are formed in tread section 62.

The ply reinforcement of tire 60 consists of a plurality of fiber layers 66 and a central solid core section 67 comprising a section of elastomeric material.

The ends of the fibers in each layer are either attached to themselves or to a rigid or elastic frame near the attachment to the wheel. The beads, or wheel rim in the case of a solid wheel (neither of which are illustrated) may serve as the frame.

The rubber portion of the tire, in the embodiments shown in FIGS. 5–7, must be kept away from all except the inner layer of fibers. For this purpose, a bonding layer of solid material (not shown) may be employed. This allows the fibers to slide over one another between the mat surfaces, yet allows the shear loads in the rubber portion of the tire to be transferred to the fibers. The outermost layer, i.e., the one exposed to the pressurized air in the tire, should also be covered with a solid material, preferably distensible. These two insulating layers serve to seal the mat of fibered layers.

The fibered layers should be lubricated so that the fibers from one layer can slide down between the fibers in the adjacent layer as the mat is compressed. For this reason, a light coating of graphite may be dusted on each layer prior to sealing the mat with the bonding and sealing layers. Other lubricants can be employed.

While only two sets of parallel fibers have been shown and described, any number of sets of fibers may be used and which may intersect each other at the same or different angles within the same layer. Usually, angle α is from 0° to 3° although much larger angles may be used. In this regard, the mean fibers angle of each layer relative to a coordinate axis of the next layer is preferably not more than 6°.

The node points joining fiber to each adjacent fiber are preferably spaced at from 5 to 50 fiber diameters along the length of the fiber and are preferably in staggered position. They should also be small in size to allow the fibers to slide over one another. However, there is no requirement that the fiber diameters be constant.

Since the heat from flexing of the mat is at a minimum there is no restriction on the size of the reinforcement mat, i.e., a solid tire, as in FIGS. 6 and 7, can be made of this material which is resilient yet highly deformable.

If stiff instead of flexible fibers are used in this mat, a serviceable mat may be obtained without tethering the ends of the fibers to a rigid or elastic frame.

Since thickness is no restriction in the design of the mat, exceedingly weak and distensible materials such as rubber, plastics, glass, cane and wood may be used as fibers. The fibers may be constructed so as to be hollow for carrying heating, cooling or other fluids.

Also, there is no need for excessively thin side walls on a tire casing when using the instant construction.

Obviously, a mat formed in accordance with the aforestated principles need not be limited in application to tire casings and reinforcement. Such construction can be used in any application where shock, vibrations or cyclic loading occurs, e.g., motor mounts, industrial bumpers, cushions, building and room encasements for isolation from shock environment, (bomb shelters, missile silos, pressure vessels, etc.) automobile suspension systems and the like.

What is claimed is:

1. A mat structure comprising a plurality of fiber layers, each fiber layer comprising at least two sets of parallel fibers, one set being disposed angularly with respect to the other, the two sets defining a mean angular disposition for the layer, each successive layer being disposed angularly with respect to the adjacent layer with alternate layers also being angularly disposed with each other, each set of parallel fibers within each layer being attached to one another at a plurality of points of intersection, each layer being attached to the adjacent layers at a plurality of node points, said node points being spaced from said fiber intersection points within each layer whereby when the mat is compressed or stressed by external forces on the mat, the fibers of each layer will tend to mesh with fibers of adjacent layers.

2. The combination as in claim 1 wherein the node points connecting a layer with one of the two adjacent layers are spaced from the other node points connecting said layer with the other adjacent layer.

3. The combination as in claim 1 wherein the two sets of fibers within each layer are angularly disposed from 0° to 3° with respect to one another.

4. The combination as in claim 1 wherein the mean angular disposition of one layer with respect to any adjacent layer does not exceed 6°.

5. The combination as in claim 1 wherein the node points joining the fibers of one layer to those of an adjacent layer are preferably spaced at 5 to 50 fiber diameters along the length of the fibers.

6. A mat structure comprising a plurality of fiber layers, each fiber layer comprising at least two sets of parallel fibers, one set being disposed angularly from 1° to 3° with respect to the other, the two sets defining a mean angular disposition for the layer, each successive layer being disposed angularly with respect to the adjacent layer with alternate layers also being angularly disposed with each other, each set of parallel fibers within each layer being attached to one another at a plurality of points of intersection, each layer being attached to the adjacent layers at a plurality of node points, such node points being spaced from said fiber intersection points within each layer whereby when the mat is compressed or stressed by external forces on said mat, the fibers of each layer will tend to mesh with fibers of adjacent layers.

7. The combination as in claim 6 wherein the node points connecting a layer with one of the two adjacent layers are spaced from the other node points connecting said layer with the other adjacent layer.

8. The combination as in claim 6 wherein the mean angular disposition of one layer with respect to any adjacent layer does not exceed 6°.

9. The combination as in claim 6 wherein the node points joining the fibers of one layer to those of adjacent layer are preferably spaced at 5 to 50 fiber diameters along the length of the fibers.

10. A mat structure comprising a plurality of tethered but free sliding fiber layers, each fiber layer comprising at least two sets of tethered but free sliding parallel fibers, one set being disposed angularly with respect to the other, the two sets defining a mean angular disposition for the layer, each successive layer being disposed angularly with respect to the adjacent layer with alternate layers also being angularly disposed with each other, the tethering of each set of parallel fibers within each layer being attachments to one another at a plurality of points of intersection, the tethering of each layer being attachments to the adjacent layers at a plurality of node points, said node points being spaced from said fiber intersection points within each layer whereby when the mat is repeatedly compressed, stretched, or flexed by external forces on said mat, the fibers of each layer will be free to slide or roll laterally to their line of direction and will reversibly tend to mesh and unmesh with fibers of adjacent layers.

11. A mat comprising a plurality of fiber layers, each fiber layer comprising at least two sets of parallel fibers, one set being disposed angularly with respect to the other, the two sets defining a mean angular disposition for the layer, each successive layer being disposed angularly with respect to the adjacent layer with alternate layers also being angularly disposed with each other, each set of parallel fibers within each layer being attached to one another solely at a plurality of points of intersection, each layer being attached to the adjacent layers solely at a plurality of node points whereby when the mat is compressed or stressed by external forces on said mat, the fibers of each layer will tend to mesh with fibers of adjacent layers.

12. The mat of claim 11 wherein lubrication means are placed within the reinforcement mat to aid in the fiber movement.

13. The mat of claim 11 wherein said node points are spaced from said fiber intersection points within each layer.

14. The mat of claim 11 wherein the node points connecting a layer with one of the two adjacent layers are spaced from the other node points connecting said layer with the other adjacent layer.

References Cited
UNITED STATES PATENTS

| | | | |
|---|---|---|---|
| 2,664,375 | 12/1953 | Slayter | 161—Dig. 6 |
| 3,644,165 | 2/1972 | Chen | 161—143 |
| 2,734,841 | 2/1956 | Merriman | 161—157 |
| 3,755,054 | 8/1973 | Medney | 161—57 |
| 3,222,440 | 12/1960 | Murphy | 161—Dig. 6 |

GEORGE F. LESMES, Primary Examiner

W. R. DIXON, Jr., Assistant Examiner

U.S. Cl. X.R.

161—57, 59, 144, 157